Dec. 29, 1953    H. HAIDEGGER    2,663,943
DEVICE FOR TESTING THE TOLERANCES OF WORKPIECES
Filed May 1, 1950                                      2 Sheets-Sheet 1

INVENTOR
HANS HAIDEGGER
BY Edward V Connors
ATTORNEY

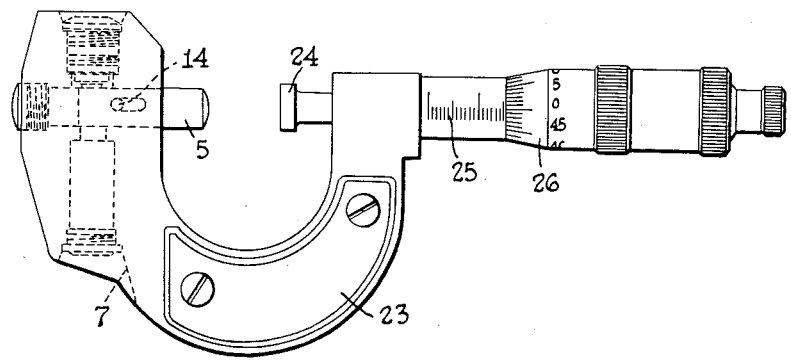
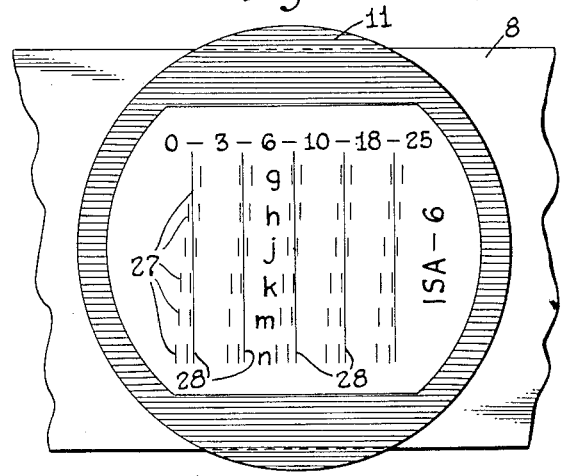
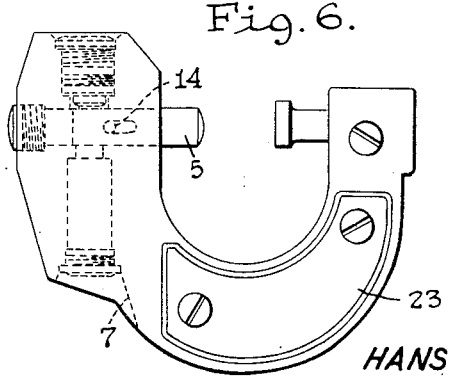

Patented Dec. 29, 1953

2,663,943

UNITED STATES PATENT OFFICE 2,663,943

DEVICE FOR TESTING THE TOLERANCES OF WORKPIECES

Hans Haidégger, Soleure, Switzerland, assignor to Ebauches S. A. Grenchen, Canton of Soleure, Switzerland, a corporation Application May 1, 1950, Serial No. 159,193

Claims priority, application Switzerland May 4, 1949

8 Claims. (Cl. 33—166)

This invention relates to devices for testing the tolerances of work pieces.

Up till now, inside dimensions, such as, for instance, bore holes have been measured by means of internal measurement instruments and outside dimensions, such as the diameters of shafts, pivots, etc. by means of external measurement instruments, such as micrometers for instance. Today, highly developed internal and external measurement instruments are available. However, they all have the disadvantage that for checking the tolerances of the dimensions measured by means of them require special equipment. In the case of inside dimensions for instance, plug gauges are used for checking the tolerance. If an internal measurement instrument is for instance made for a measuring range of 60 to 80 millimeters, and if three tolerance qualities are used for each millimeter of the dimension, 63 plug gauges are necessary for one single measurement instrument. This number grows with an increasing measuring range. In the case of external measurement instruments, such as micrometers for instance, gap gauges are necessary for checking the tolerance. Here too, 63 gap gauges are necessary for one single micrometer for a measuring range of from 60 to 80 millimeters and at three tolerance qualities per millimeter measuring range. Therefore, such an equipment with the numerous corresponding tolerance testers is very expensive.

The tester according to the invention is characterised in that it comprises two parts provided with marks, the one part being displaceable with regard to the other, and further characterized in that the marks of the one part are arranged in such a way with regard to the marks of the other part that, after a displacement of the movable part by the work piece to be tested, the marks indicate the admission or non-admission of the allowance of the work piece by their mutual position.

This tester may for instance be combined with an internal measurement instrument for determining the dimension itself. In this case, the one part, besides the marks for checking the tolerance, comprises a nonius cooperating, for the determination of the work piece dimension, with a scale of the other part, this scale consisting of marks, at least some of which cooperate with the marks of the other part, so that simultaneously with the reading of the dimension the allowance of the latter may be checked. If such an instrument has a measuring range of from 60 to 80 millimeters, the marks on both parts of the testing device may be provided in such a way, that 63 different tolerances may be checked with the help of one and the same instrument. In this way, 63 plug gauges may be saved.

The tester according to the invention may, however, also be combined with a micrometer for determining outside dimensions. In this case, the one of the two parts may for instance comprise one mark for each measuring range, while the other part comprises for each measuring range two marks limiting the allowed clearance space for the measuring range, the mark of the first part, on an admissible allowance of the work piece lying in the allowed clearance space. If, on the first part, several marks lying side by side are provided, and each of these marks belongs to another measuring range, while the other part comprises several clearance spaces lying side by side and each limited by two marks, so that each of these clearance spaces corresponds to one of the above-mentioned measuring ranges, then, at one single row of such clearance spaces lying side by side, a certain fit of a class of fits can be checked through several partial measuring ranges by means of one and the same micrometer. If, furthermore, several rows of clearance spaces lying below one another are provided on the one part of the tester, while the division marks of the other part go through all the rows of clearance spaces, as many fits of a certain class of fits within several partial measuring ranges can be checked as to their tolerance, as the tester comprises rows of clearance spaces lying below one another. By such a combination of the tester according to the invention with a micrometer the hitherto necessary gap gauges for checking the tolerances can be saved. According to the number of rows of clearance spaces lying below one another, far more than hundred gap gauges may in certain cases be omitted for each micrometer.

Moreover, while hitherto one and the same gap gauge could only be used for one single tolerance of a certain kind of fit, a gap gauge made according to the invention may be used for checking the tolerances of several fits. In this way, in a factory a considerable reduction of the number of gap gauges is obtained.

The accompanying drawings illustrate, by way of examples, some embodiments of the invention.

Fig. 4 is an outside view of a micrometer comprising a tester according to the invention.

Fig. 5 shows the tolerance tester combined with the micrometer on a larger scale than Fig. 4.

Fig. 6 is an outside view of a gap gauge equipped with a tester according to the invention.

Figure 1:
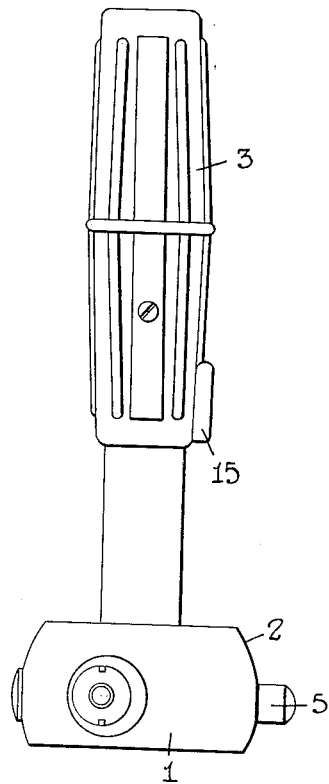
Fig. 1 is an outside view of an inside measuring instrument combined with a tester according to the invention.
Figure 2:
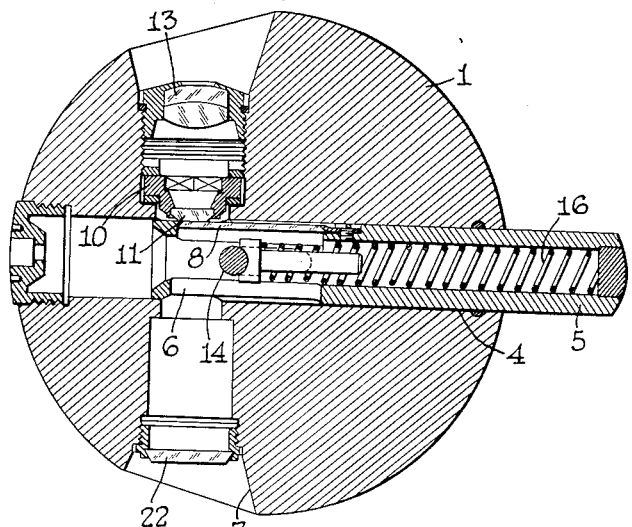
Fig. 2 is a section on a larger scale, through the head of the inside measuring instrument and through the axis of the feeler member of the latter.
Figure 3:
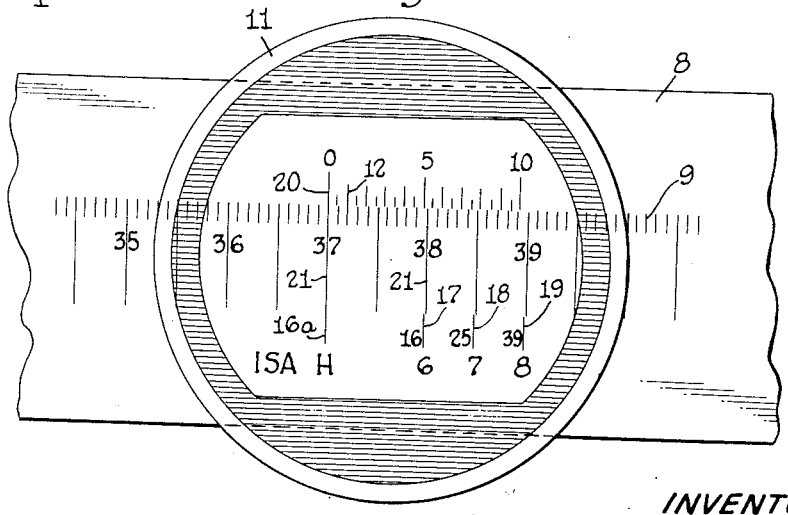
Fig. 3 illustrates, on a larger scale, the tolerance tester built into the said inside measuring instrument.

Figs. 1 and 2 represent an inside measuring instrument, such as is for instance shown in the copending patent application Ser. No. 785,882. Figs. 5 and 6 of the above-mentioned application relate to such an instrument without tolerance tester. This inside measuring instrument has a head 1 with a spherical surface 2 and a hollow handle 3. The head 1 has a radial bore hole 4 in which the pin-shaped feeler member 5 is slidably arranged. This feeler member 5 is pierced as at 6 and carries a transparent rule 8 in reach of the opening 7 of the head 1 crossing the axial direction of the feeler member 5 and going through the bore hole 4. The rule 8 is partially shown in Fig. 3 and its scale 9 corresponds to the measuring range of the measuring instrument. A transparent disk 11 with a nonius 12 is fixed in a sleeve-shaped setting 10 mounted in the head 1. At the side of the feeler member 5 opposite to the nonius 12 a magnifying means in the shape of a lens 13 is provided in the opening 7 of the head 1. The feeler member 5, in its final position taken on tapping the bore hole to be tested, is locked by an automatic wedge brake, of which only the wedge pin 14 is shown. This brake, which is not essential for the comprehension of the invention, is not shown and described in more detail. It may only be mentioned that the knob 15 in Fig. 1 belongs to a lever not shown, serving the purpose of releasing the wedge brake for returning the feeler member 4 into its outermost position under the constraint of the spring 16. Besides the scale 9 consisting of a row of division marks serving for the determination of the dimension to be measured of the work piece and provided on the part 8 fixed to the feeling member 5 and displaceable with regard to the part 11, the following device is provided for determining the admission or non-admission of the tolerance at the same time with the reading of the dimension to be measured:

The disk-shaped part 11 comprises division marks 16a, 17, 18 and 19 on the side of the scale 9 opposite to the nonius 12. The division mark 16a lies in the same straight line as the zero mark 20 of the nonius 12. The division marks 21 of the scale 9 of the movable part 8, indicating entire millimeters are prolonged to such an extent that they form together with the division marks 16a—19 an uninterrupted line when they are in alignment with these latter marks. This position is shown in Fig. 3 for the division mark indicating 37 millimeters and for the division mark 16a of the part 11, which, as mentioned above, lies in the same straight line as the zero mark 20 of the nonius 12. The division marks 16a—19 in cooperation with the prolonged division marks 21 of the scale 9 serve the purpose of indicating whether the tolerance of the dimension measured by means of the scale 9 and the nonius 12 is within or beyond the not-go limit.

Fig. 3 shows an example of the ISA-classification of fits (International Federation of the National Standardizing Associations).

The designation H belongs to the division mark 16a, the designation 6 to the division mark 17, the designation 7 to the division mark 18 and the designation 8 to the division mark 19. The numbers 16, 25, 39 left to the division marks 17, 18, 19 give the tolerances of 16/1000, 25/1000 and 39/1000 millimeters allowable with the ISA-kinds of fits H6, H7, H8.

On measuring a bore hole, the illustrated tester works in combiantion with the reading device 9, 12 as follows: If the bore hole of a work piece with the fit ISA-H6 is to be measured, the measuring head 1 is inserted into the bore hole while holding the axis of the handle 3 inclined with regard to the axis of the bore hole to be tested. Thereafter, the measuring instrument is swung until the axis of the feeler member 5 comes into a cross section plane of the work piece. On this swinging movement, the feeler member 5 is automatically pushed inwards and, under the locking action the brake pin 14 remains in the innermost position into which it has been displaced. Now, the instrument is taken out of the bore hole to be tested and the magnifying lens 13 is brought in front of the eye while looking through the instrument in the direction of the transparent cover 22, and now the dimension desired of the bore hole can be read by means of the scales 9 and 12. In the example shown in Fig. 3, the bore hole has a diameter of 37.00 millimeters. Now, while looking through the measuring head 1 for reading the dimension, it may at the same time be checked whether the dimension is within the required allowance of the ISA-fit H6 or not. In Fig. 3, the division mark 16a lies in the same straight line as the division mark 21 belonging to the millimeter number 37. The division mark 17 lies slightly left to the division mark 21, which belongs to the millimeter number 38. This means that the allowance of the bore hole lies within the admissible limits. Should the division mark 16a lie left to the division mark for the millimeter number 37, the bore hole would be too small, and should the division mark 17 lie right to the division mark for the millimeter number 38, the bore hole would be too large, and, in both such cases, the work piece would be waste, that is, would lie beyond the not-go limit. On gauging the distance of the division mark 16a from the mark 17 is therefore to be chosen in such a way that the above-described positions with regard to the division marks of the scale 9 for entire millimeters occur either in the case of admissible or inadmissible allowances.

From the above it follows that, together with the reading of the dimension, also the allowance may be checked and that without any special checking manipulation with the help of a plug gauge. Similar occurs for the division marks 16a and 18 of the ISA-kind of fit A7, and for the division marks 16a and 19 of the ISA-kind of fit A8. Here too, as soon as the division mark 16a lies left to division mark 21, or the division marks 18 and 19, right to division marks 21, the allowance is beyond the not-go limit. The number of division marks 16a, 17, 18, 19 may be multiplied, so that the instrument could also be used for other kinds of fits. However, in certain cases the division marks 16a, 17 may be sufficient. Furthermore, further rows of fit division marks might be provided below the row of the division marks 16a, 17, 18, 19. In this case, the division marks 21 must be extended so far towards the bottom that they reach into the range of these further rows of fit division marks. The measuring instrument may thus be made for a smaller or greater number of fits. Moreover, the application of the invention is not limited to the ISA-classification of fits, but may also be used for the ASA-classification (American Standards Association) the DIN-classification (Association of German Engineers) or for the classification of fits of any special factory such as it is for instance used in motor car construction.

Figs. 4 and 5 illustrate the tolerance tester according to the invention in combination with a micrometer for outside dimensions. This instrument comprises a stirrup or yoke 23, as it is for instance used in gap gauges. The right end of this stirrup 23 carries a micrometer of well-known construction with a displaceable feeler pin 24, a scale 25 and a nonius drum 26, while the other end carries a feeler member 5 corresponding to that shown in Fig. 2. The feeler member 5 is pierced, lies under the constraint of a non-illustrated spring corresponding to spring 16 of Fig. 2 and is likewise held in position by a wedge brake 14. However, in this example, the wedge brake is not to be released by a knob 15 as in the preceding embodiment, but simply by pressing onto its end accessible from the outside. Here too, a through-hole 7 is provided, in reach of which the part 8 of Fig. 5 forming a graticule is fixed to the feeler member 5 and cooperates with the immovable part 11 likewise forming a graticule. Since in this example it is the question of a micrometer, it is no longer the dimension of the work piece which is to be read simultaneously with the checking of the tolerance, but here, only the tolerance is checked by looking through the opening 7. Therefore, also the arrangement of the division marks of the parts 8 and 11 is different from that shown in Figs. 1 to 3.

The upper portion of the immovable part 11 carries the designation 0—3—6—10—18—25. This designation includes five partial measuring ranges on the whole, namely one from 0–3 millimeters, another from 3–6 millimeters, one from 6–10 millimeters, from 10–18 millimeters and another one from 18–25 millimeters. The tester illustrated in Fig. 5 is gauged for the classification ISA-6 with the fits g—h—j—k—m—n. To each of these fits belongs a horizontal row of clearance spaces on the part 11, and to each partial measuring range belongs a single clearance space of this row. Each of the clearance spaces is limited by two short division marks 27 lying at a smaller distance from each other. Each of these clearance spaces lies about in the middle of the distances taken by the number intervals 0-3, 3-6, 6-10, 10-18 and 18-25 below the same. The distance of adjacent clearance spaces from each other is larger than the length of the single clearance spaces. On the whole, six rows of clearance spaces are arranged below one another, in accordance with the different fits g, h, j, k, m, n. In accordance with the different tolerances prescribed for the different fits, the clearance spaces lying below one another for one and the same partial measuring range are slightly displaced with regard to one another towards the left, seen from the top to the bottom in Fig. 5. The movable part 8 carried by the feeler member 5 has for each partial measuring range a vertical division mark 28, extending all over the rows of clearance spaces of all fits. These division marks 28 are arranged in such a way with regard to the corresponding clearance spaces of the different fits that in the case of an admissible tolerance of the different fits in the various partial measuring ranges, they lie within the corresponding clearance spaces. If they lie outside, the tolerance is beyond the not-go limit.

The instrument shown in Figs. 4 and 5 may be handled as follows:

Before checking the allowance, the scale 25 and the nonius of the drum 26 are adjusted to the nominal size of the work piece by rotating the drum 26. Afterwards, the work piece is inserted between the feeler member 5 and the feeler member 24, whereby the feeler member 5 is more or less displaced in axial direction against the effect of the pin brake 14 in accordance with the size of the allowance of the work piece. Afterwards, the workpiece is removed, while the feeler member 5 is automatically locked in its new position by the pin 14. Now, the worker looks through the opening 7 to determine whether the division mark 28 of the part 8, belonging to the measuring range of the work piece, lies within the clearance space of the fit required. Should this division mark 28 lie outside of this clearance space, the work piece is waste.

Here too, the number of rows of clearance spaces lying below one another might be augmented for further fits. This may also be done with the number of partial measuring ranges. Here too, another than the ISA-classification of fits may be used. Both, in the first and in the second example, a division mark arrangement of such a kind might be chosen that different classifications of fits occur, so, for instance, the ISA- and the ASA-classifications.

Fig. 6 illustrates a gap gauge in which a tolerance tester according to the invention is provided. The left portion of the stirrup or yoke 23 is identical with the corresponding device shown in Figs. 4 and 5, while the micrometer of Fig. 4 is lacking. Therefore, and at a certain nominal size of the work piece this gap gauge allows of checking the work piece allowance at different fits, so for instance at six different ISA-fits 6g, h, j, k, m, n. For one nominal size of six fits only one gap gauge is thus necessary instead of six, as before.

While I have shown and described some performance of my invention, I do not wish to limit the scope of my Letters Patent to these embodiments, but reserve the right of making such modifications as fall within the purview of the appending claims.

What I claim is:

1. A gage comprising a body having a stationary feeler surface, a movable member carried by the body and providing a movable feeler surface, a pair of graticules positioned one above the other, one of the graticules fixedly mounted by the body, the other graticule carried by the movable member for movement therewith, one of the graticules including at least two marks of predetermined spacing defining the limits of a tolerance range, and the other graticule including at least one mark acting as an indicator, the relative position of the indicator mark and tolerance range marks depending upon the relative position of the movable feeler with respect to the stationary feeler, whereby an indication is given as to whether the dimension is within the tolerance range.

2. A gage according to claim 1 in which one of the two graticules comprises at least two rows of marks for tolerance checking, one of these rows lying beyond the other row.

3. A gage according to claim 1 in which one of the two graticules includes one mark for each measuring range, the other graticule including two marks for each measuring range and limiting the admissible clearing space for the measuring range, the mark of the first graticule lying in the admissible clearance space for work within the tolerance range.

4. A gage according to claim 1 in which the first graticule includes several marks lying side by side and denoting separate measuring ranges, the other graticule including several clearance spaces lying side by side and designated by two marks, each of the clearance spaces corresponding to one of the said measuring ranges.

5. A gage according to claim 1 in which the first graticule includes several marks lying one behind another, the second graticule including several rows of clearance spaces lying one below another, each row corresponding to a certain fit in the different measuring ranges, each mark of the first graticule extending through all the rows of clearance spaces.

6. A gage comprising a body having a stationary feeler surface, a movable member carried by the body and providing a movable feeler surface, a pair of optically magnifiable graticules positioned one above the other, one of the graticules fixedly mounted by the body, the other graticule carried by the movable member for movement therewith, one of the graticules including a scale, the other graticule including a nonius cooperating with the scale on the first graticule, one of the graticules including at least two marks of predetermined spacing defining the limits of a tolerance range, and the other graticule including at least one mark acting as an indicator, the relative position of the nonius with respect to the scale indicating a dimension and the relative position of the indicator mark with respect to the two marks indicative as to whether the dimension measured is within the predetermined tolerance range.

7. A gage comprising a body having a stationary feeler surface, a movable member carried by the body and providing a movable feeler surface, a pair of optically magnifiable graticules positioned one above the other, one of the graticules fixedly mounted by the body, the other graticule carried by the movable member for movement therewith, one of the graticules including a scale, the other graticule including a nonius cooperating with the scale on the first graticule, the graticule including the nonius also including at least two marks of predetermined spacing defining the limits of a tolerance range, and the other graticule including at least one mark acting as an indicator, the relative position of the nonius with respect to the scale indicating a dimension and the relative position of the indicator mark with respect to the two marks indicative as to whether the dimension measured is within the predetermined tolerance range.

8. A gage comprising a body having a stationary feeler surface, a movable member carried by the body and providing a movable feeler surface, a pair of optically magnifiable graticules positioned one above the other, one of the graticules fixedly mounted by the body, the other graticule carried by the movable member for movement therewith, one of the graticules including a scale, the other graticule including a nonius cooperating with the scale on the first graticule, the graticule including a nonius also including at least two marks of predetermined spacing defining the limits of a tolerance range and positioned so as to appear as on the opposite side of the scale from the nonius, and the other graticule including at least one mark acting as an indicator, the relative position of the nonius with respect to the scale indicating a dimension and the relative position of the indicator mark with respect to the two marks indicative as to whether the dimension measured is within the predetermined tolerance range.

HANS HAIDÉGGER.

References Cited in the file of this patent

UNITED STATES PATENTS

| Number | Name | Date |
|---|---|---|
| 2,336,393 | Combes | Dec. 7, 1943 |
| 2,356,037 | Drucker | Aug. 15, 1944 |

FOREIGN PATENTS

| Number | Country | Date |
|---|---|---|
| 68,847 | Switzerland | July 11, 1914 |
| 143,050 | Great Britain | Nov. 25, 1919 |
| 157,628 | Great Britain | Apr. 22, 1920 |
| 619,090 | Germany | Sept. 21, 1935 |

OTHER REFERENCES

Publ.: Popular Mechanics, Jan. 1943, page 153.